(12) United States Patent
Craig et al.

(10) Patent No.: US 8,302,028 B2
(45) Date of Patent: Oct. 30, 2012

(54) EXPANDABLE AREA FOR HOST TABLE DATA DISPLAY IN A MOBILE DEVICE

(75) Inventors: Ronald E. Craig, Pittsboro, NC (US); Gerald L. Mitchell, Jr., Durham, NC (US); Masaaki Takamiya, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 716 days.

(21) Appl. No.: 12/233,046

(22) Filed: Sep. 18, 2008

(65) Prior Publication Data

US 2010/0070914 A1     Mar. 18, 2010

(51) Int. Cl.
G06F 3/048 (2006.01)
(52) U.S. Cl. .......................... 715/798; 715/218; 715/227
(58) Field of Classification Search .................. 715/227, 715/744, 798, 218
See application file for complete search history.

(56) References Cited

U.S. PATENT DOCUMENTS

| | | | | |
|---|---|---|---|---|
| 5,792,659 A * | 8/1998 | Janay et al. | .................... | 715/744 |
| 6,205,453 B1 * | 3/2001 | Tucker et al. | .................. | 715/202 |
| 6,252,607 B1 * | 6/2001 | Babcock | ....................... | 345/468 |
| 6,286,025 B1 * | 9/2001 | Chang | ........................... | 718/100 |
| 6,526,399 B1 * | 2/2003 | Coulson et al. | ......................... | 1/1 |
| 6,976,226 B1 * | 12/2005 | Strong et al. | ................... | 715/788 |
| 7,607,088 B2 * | 10/2009 | Bertram et al. | ................ | 715/711 |
| 2002/0103832 A1 * | 8/2002 | Howarth | ........................ | 707/526 |
| 2005/0125735 A1 * | 6/2005 | Cohen et al. | ................... | 715/746 |
| 2006/0107196 A1 * | 5/2006 | Thanu et al. | ................... | 715/503 |
| 2007/0033518 A1 * | 2/2007 | Kenna et al. | ................... | 715/503 |
| 2009/0031208 A1 * | 1/2009 | Robinson | ....................... | 715/227 |
| 2009/0172516 A1 * | 7/2009 | Gill | ................................ | 715/228 |
| 2009/0319882 A1 * | 12/2009 | Morrison et al. | .............. | 715/227 |

* cited by examiner

*Primary Examiner* — Doon Chow
*Assistant Examiner* — Conrad Pack
(74) *Attorney, Agent, or Firm* — Law Office of Jim Boice

(57) ABSTRACT

A system, method and computer-readable medium are disclosed for providing improved display of a host terminal application interface. A host application translator reads characters stored in a character buffer of a computer host terminal application that is displayed to a user as a table of horizontal rows and vertical columns of characters. The host application translator receives a preference that determines which vertical columns are to be displayed and a second preference that determines the order in which the vertical columns are to be displayed. The host application translator reconfigures the display of the characters by displaying the vertical columns indicated by the first preference in the order indicated by the second preference and displaying information corresponding to the vertical columns that are not indicated by the first preference, thus providing user-selectable controls to expand or collapse this information.

3 Claims, 5 Drawing Sheets

EXPANDABLE AREA FOR HOST TABLE DATA DISPLAY IN A MOBILE DEVICE

BACKGROUND OF THE INVENTION

To provide users access to a mainframe computer, a host terminal application executing on a computer terminal with limited data processing capability was used to input commands and receive output data from a mainframe computer, replacing the use of punch cards. The computer terminal communicated with the mainframe over a serial data link and displayed information to the user as lines of fixed-width characters. Typically each line displayed 80 or 132 characters horizontally across a display. Since the characters were fixed-width, characters could be formatted in columns and the formatting would be displayed the same on any computer terminal. Output data was commonly displayed to a user in tabular format known as host tables. Given that each character was the same fixed width, host tables were created by ordering related data into horizontal rows and vertical columns. As the use of personal computers became more prevalent, host terminal applications were executed on personal computers, replacing the computer terminal. A host terminal application executing on a personal computer enabled a user of the personal computer to communicate with a mainframe computer as if the user were using a computer terminal connected to the mainframe computer.

Today's business users have grown accustomed to the ease of use of modern Web-based applications. Host application conversion technology is used with legacy terminal host applications to provide a quick and easy way to replace traditional displays with a familiar point-and-click interface. Host application conversion technology enables the proven, reliable host terminal applications, which are comparatively more difficult to learn and use, to be modernized with applications having a more familiar graphical user interface.

Once converted, the host terminal application is often displayed in an application window that is smaller than the display size of the original host terminal application. The converted host terminal application may be displayed on a data processing system having display sizes smaller than a typical computer workstation, such as personal digital assistants (PDAs), mobile telephones, interactive kiosks and remote displays. The converted host terminal application may also be displayed on the larger display of a typical computer workstation but in an application window having a reduced size so that the application window can be monitored while other windows are open, such as dashboard widgets and sidebar gadgets. In one example, legacy host application screens are translated into markup language code that is then viewed in a mobile browser application, such as Microsoft Internet Explorer Mobile. When attempting to display previously created data with a fixed layout, such as table data on a legacy host application screen, the data is larger than the amount of horizontal space available because host terminal applications were designed with the assumption of displaying 80 or 132 or more characters horizontally.

One solution known in the prior art for displaying legacy host application screens in application windows having a reduced size is to introduce horizontal scrolling. However, horizontal scrolling requires additional screen space and is not data-sensitive or intuitive with respect to the original layout of the host application screen.

Another solution known in the prior art is the one-column layout approach, which breaks each column out and displays them in succession in the page vertically. Stringing a table down the screen in this way makes it difficult or impossible to do many of the things that were simple with a table layout (e.g., comparing columns of figures or locating the desired row or record becomes very cumbersome). Tables that are rearranged in a one-column layout become much harder to read and interpret.

Yet another prior art approach is to truncate the width of all columns in order to fit the table into the page. Wide tables, such as tables found in legacy host application screens, end up having the data truncated and the result is that the data is unreadable or misleading.

BRIEF SUMMARY OF THE INVENTION

The present invention provides a method, system and computer program product for improved display of host terminal applications. In one embodiment, a host application translator reads characters stored in a character buffer of a computer terminal host application that is displayed to a user as a table of horizontal rows and vertical columns of characters. The host application translator receives a preference from the user that determines which vertical columns are to be displayed. The host application translator receives a second preference from the user that determines the order in which the vertical columns are to be displayed. The host application translator reconfigures the display of the characters by displaying in an application window the vertical columns indicated by the first preference in the order indicated by the second preference; displaying a user-selectable control to display information corresponding to the vertical columns that are not indicated by the first preference; in response to the user selecting the user-selectable control, displaying information corresponding to the vertical columns that are not indicated by the first preference; and in response to a subsequent selection by the user of the user-selectable control, concealing the display of the information corresponding to the vertical columns that are not indicated by the first preference.

The above, as well as additional purposes, features, and advantages of the present invention will become apparent in the following detailed written description.

BRIEF DESCRIPTION OF THE SEVERAL VIEWS OF THE DRAWINGS

The novel features believed characteristic of the invention are set forth in the appended claims. The invention itself, however, as well as a best mode of use, further purposes and advantages thereof, will best be understood by reference to the following detailed description of an illustrative embodiment when read in conjunction with the accompanying drawings, where:

DETAILED DESCRIPTION OF THE INVENTION

An illustrative embodiment of the present invention is directed to a method, system and computer-readable medium for transforming the display of a host table in a computer terminal host application into a user interface that is better suited for display within a small application window. The present invention can take the form of an entirely hardware embodiment, an entirely software embodiment or an embodiment containing both hardware and software elements. In an illustrative embodiment, the invention is implemented in software, which includes, but is not limited to, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus or device.

The medium can be an electronic, magnetic, optical, electromagnetic, infrared or semiconductor system, apparatus or device or a propagation medium. Examples of a computer-readable medium include a semiconductor or solid state memory (e.g., flash drive memory), magnetic tape, a removable computer diskette, a random access memory (RAM), a read-only memory (ROM), a rigid magnetic disk (e.g., a hard drive) and an optical disk. Current examples of optical disks include compact disk-read only memory (CD-ROM), compact disk-read/write (CD-R/W) and Digital Versatile Disk (DVD).

Figure 1:
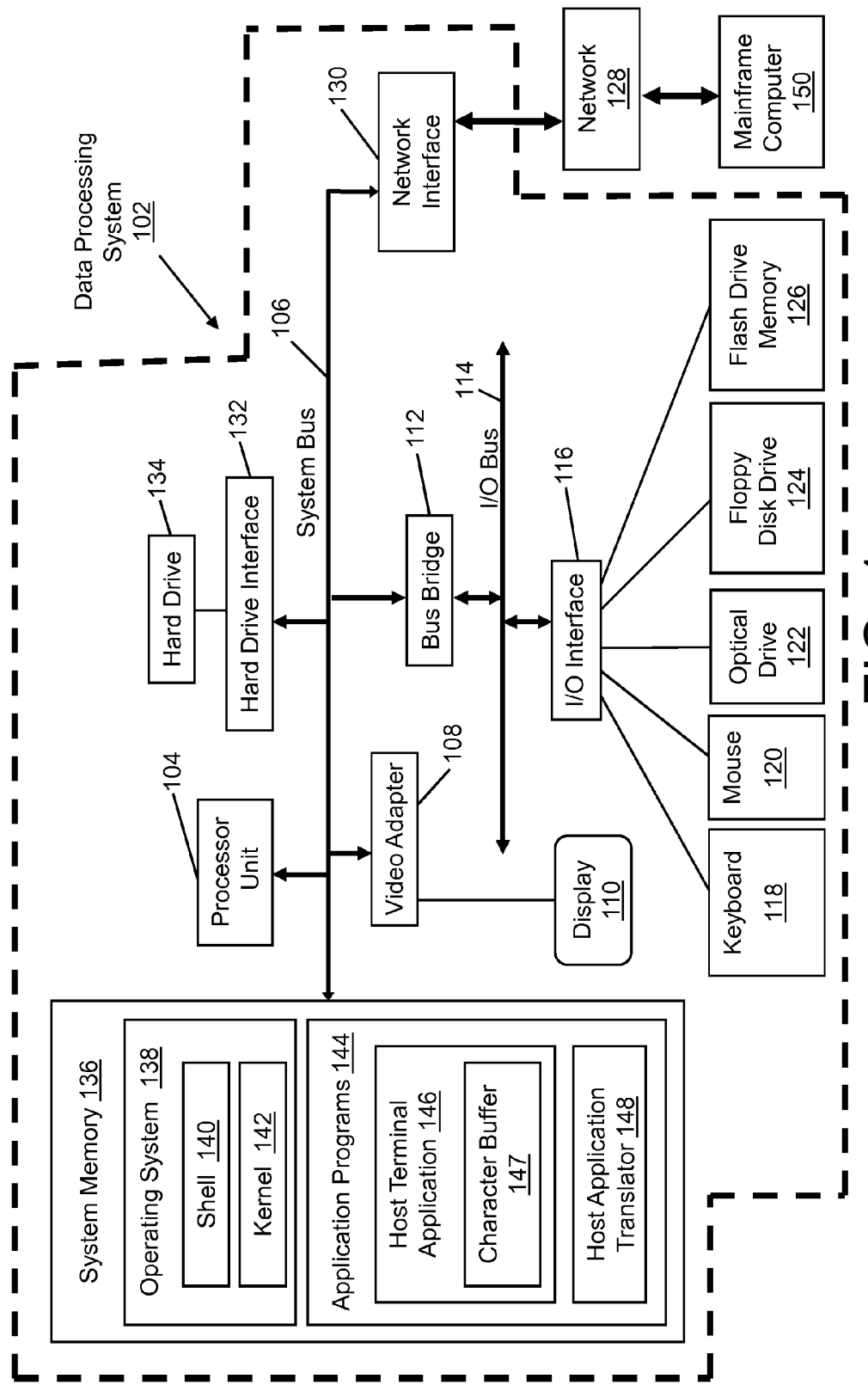
FIG. 1 is a block diagram of an exemplary data processing system in which the present invention may be implemented.

Referring now to the drawings, wherein like numbers denote like parts throughout the several views, FIG. 1 shows a block diagram of a data processing system suitable for storing and/or executing program code in accordance with one or more embodiments of the present invention. Data processing system 102 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, an optical disk drive 122, a floppy disk drive 124, and a flash drive memory 126. The format of the ports connected to I/O interface 116 may be any known to those skilled in the art of computer architecture, including but not limited to Universal Serial Bus (USB) ports.

Data processing system 102 is able to communicate with a mainframe computer 150 via a network 128 using a network interface 130, which is coupled to system bus 106. Network 128 may be an external network such as the Internet, or an internal network such as an Ethernet or a Virtual Private Network (VPN). Mainframe computer 150 may utilize a similar architecture design as that described for data processing system 102.

A hard drive interface 132 is also coupled to system bus 106. Hard drive interface 132 interfaces with hard drive 134. In a preferred embodiment, hard drive 134 populates a system memory 136, which is also coupled to system bus 106. Data that populates system memory 136 includes an operating system (OS) 138 of data processing system 102 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include host terminal application 146, which enables data processing system 102 to communicate with mainframe computer 150 over network 128. Host terminal application 146 includes character buffer 147, which is used to store characters that are displayed to a user by host terminal application 146. Host application translator 148 is an application program that translates the characters in character buffer 147 into code in accordance with one or more embodiments of the present invention.

The hardware elements depicted in data processing system 102 are not intended to be exhaustive, but rather are representative to highlight essential components required by the present invention. For instance, data processing system 102 may include alternate memory storage devices such as magnetic cassettes, Digital Versatile Disks (DVDs), Bernoulli cartridges, and the like. These and other variations are intended to be within the spirit and scope of the present invention.

Figure 2:
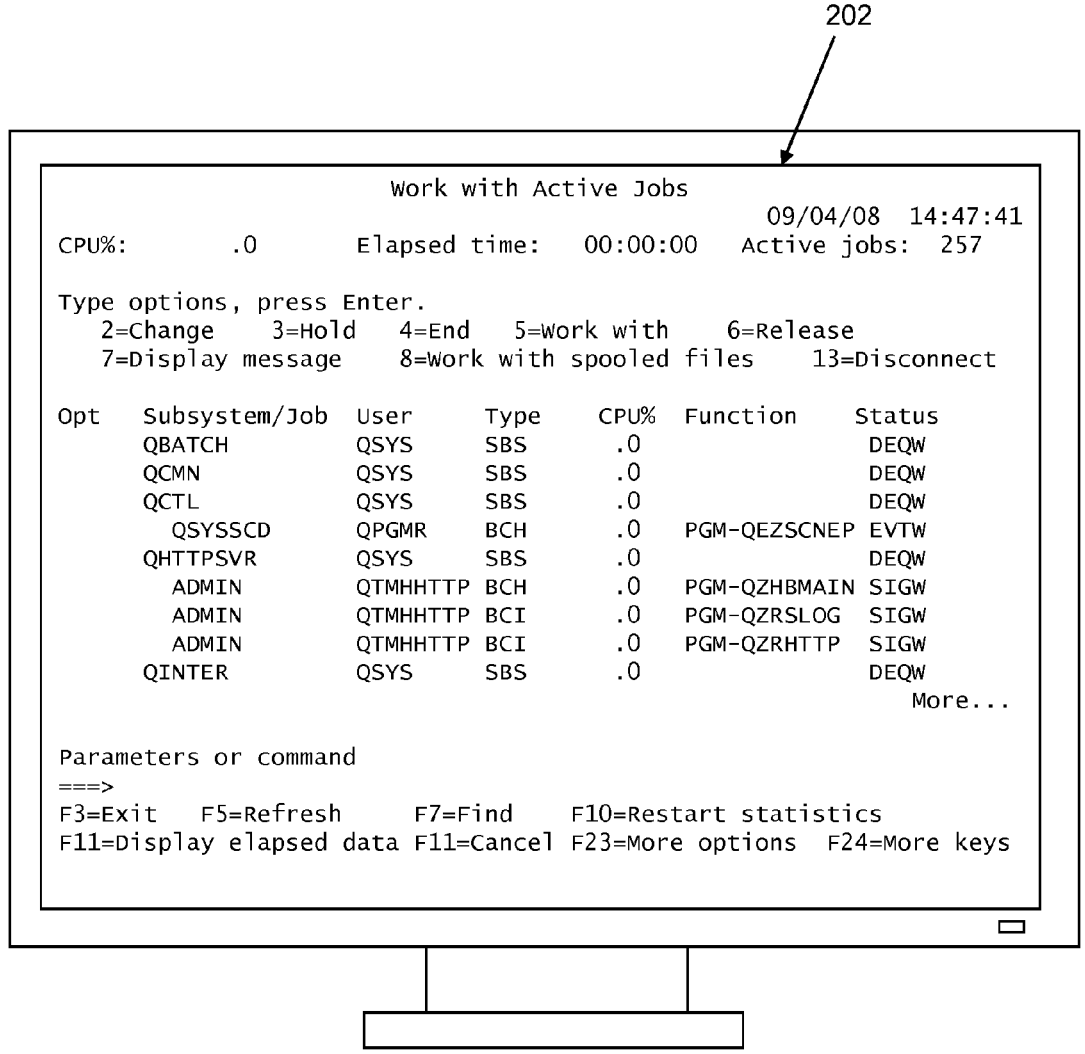
FIG. 2 shows a diagram of a prior art host terminal application displayed on a data processing system.

With reference now to FIG. 2, a diagram of a prior art host terminal application is shown displayed on data processing system 102. Data processing system 102 (e.g., a personal computer) has a large display that is similar in size to a traditional computer terminal. Application window 202 displays the output of host terminal application 146 to a user of data processing system 102, enabling the user to have input/output (I/O) access to mainframe computer 150. Host terminal application 146 displays a fixed number of characters per line, typically 80 characters per line, and a fixed number of lines, such as 25 lines. The characters are stored in character buffer 147. Some characters are used to display words or instructions for the user to read. Some information is displayed in a tabular format, where the ordering of characters into vertical columns and horizontal rows is necessary for the user to have a quick understanding of the information being displayed. Examples of vertical columns include the "User" and "Type" columns. Examples of rows include the "QBATCH" subsystem/job and the "QCMN" subsystem/job. On a personal computer with a large display resolution, all of the characters in each line can be completely displayed in a readable manner, as shown in FIG. 2.

Figure 3:
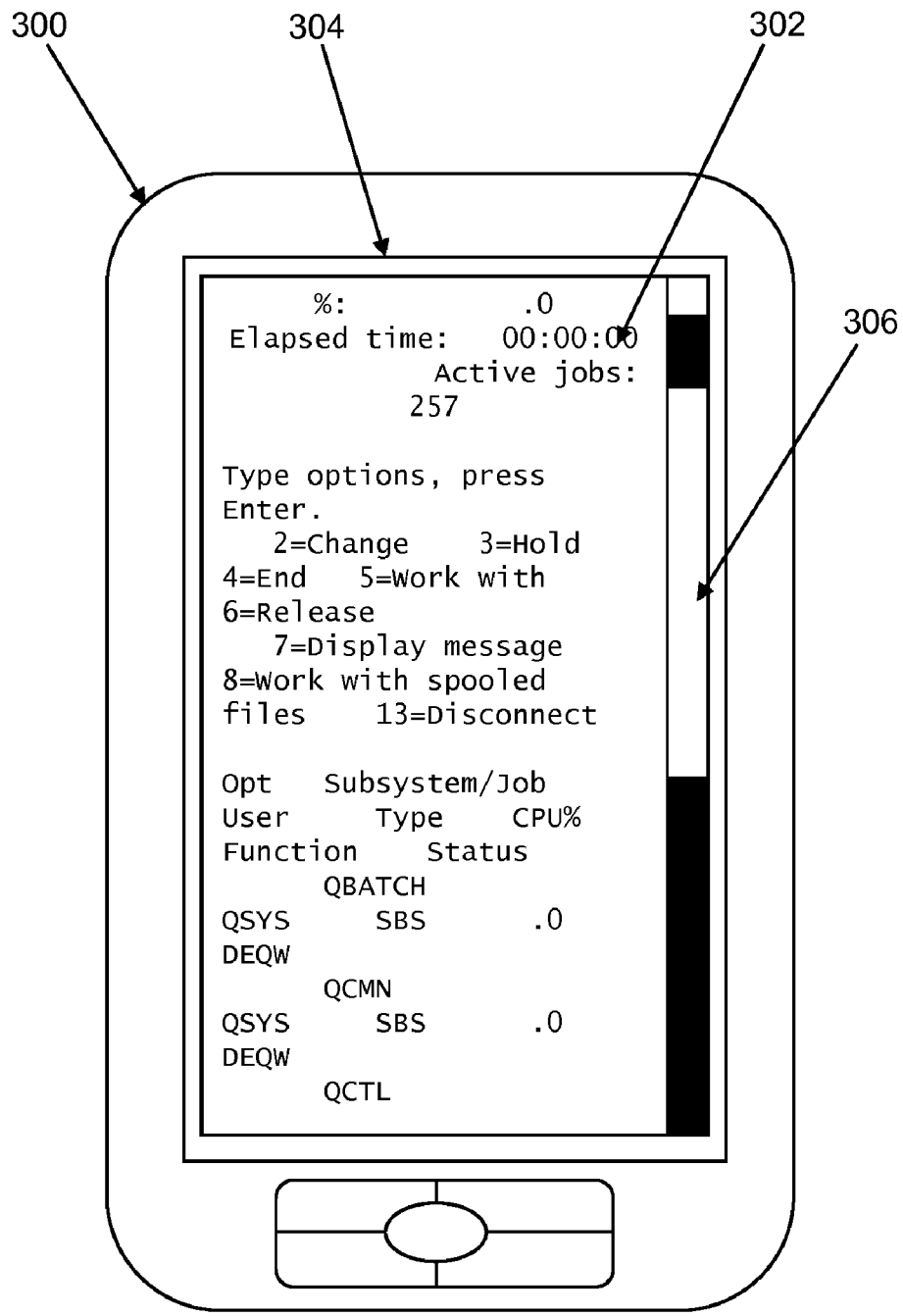
FIG. 3 shows a diagram of an application window in "fit to screen" mode displaying a host terminal application interface, as is known in the prior art.

With reference now to FIG. 3, a diagram is shown of an application window of smaller size displaying a host terminal application interface, as is known in the prior art. For example, application window 302 of FIG. 3 is shown being displayed on a portable data processing system having a small display size, such as a personal digital assistant (PDA). The characters of host terminal application 146 are transformed by a host application translator into computer-readable code that displays a host application interface to a user in a more modern and familiar format. On PDA 300, the translated code provides the user of PDA 300 I/O access to mainframe computer 150 via application window 302 displayed on PDA 300. In the prior art, there are several ways to display horizontal lines of characters that exceed the width of application window 302 In the "fit to screen" mode, as shown in FIG. 3, application window 302 compresses the display of host terminal application 146 to fit the width of display 304. The problem with this approach is that the compression of the display does not preserve the tabular ordering of the information in host terminal application 146, making it difficult for a user to readily discern information from host terminal application 146. Also, vertical scrolling is required to view all of the information displayed to the user. Scrollbar 306 is displayed in mobile browser window 302 to enable a user to scroll to see portions of host terminal application 146 that are not currently displayed. Scrolling may be an acceptable solution for larger application windows, where scrolling is minimally intrusive. But for the small size of application window 302, scrolling is not a good solution because an excessive amount scrolling is needed to see the entire contents of application window 302. In "desktop" mode, application window 302 displays each horizontal row as it would be displayed on a desktop PC having a larger display resolution. Host terminal application 146 is displayed with the same fixed number of characters per line on the smaller application window 302. Since display 304 is not capable of displaying 80 characters per line, only a portion of each line is displayed by mobile browser window 302. The tabular format is preserved, but excessive horizontal scrolling is required, making rows difficult to discern. In "one column" mode, each vertical column is broken out individually and displayed vertically in succession. It is very difficult to read a table in this mode with small application windows. All of the columns in a row may not be displayed on the same page. Stringing a table down the screen in this way makes it difficult or impossible to do many of the things that were simple with a table layout in a larger application window, such as comparing columns of figures or locating a desired row.

Figure 4:
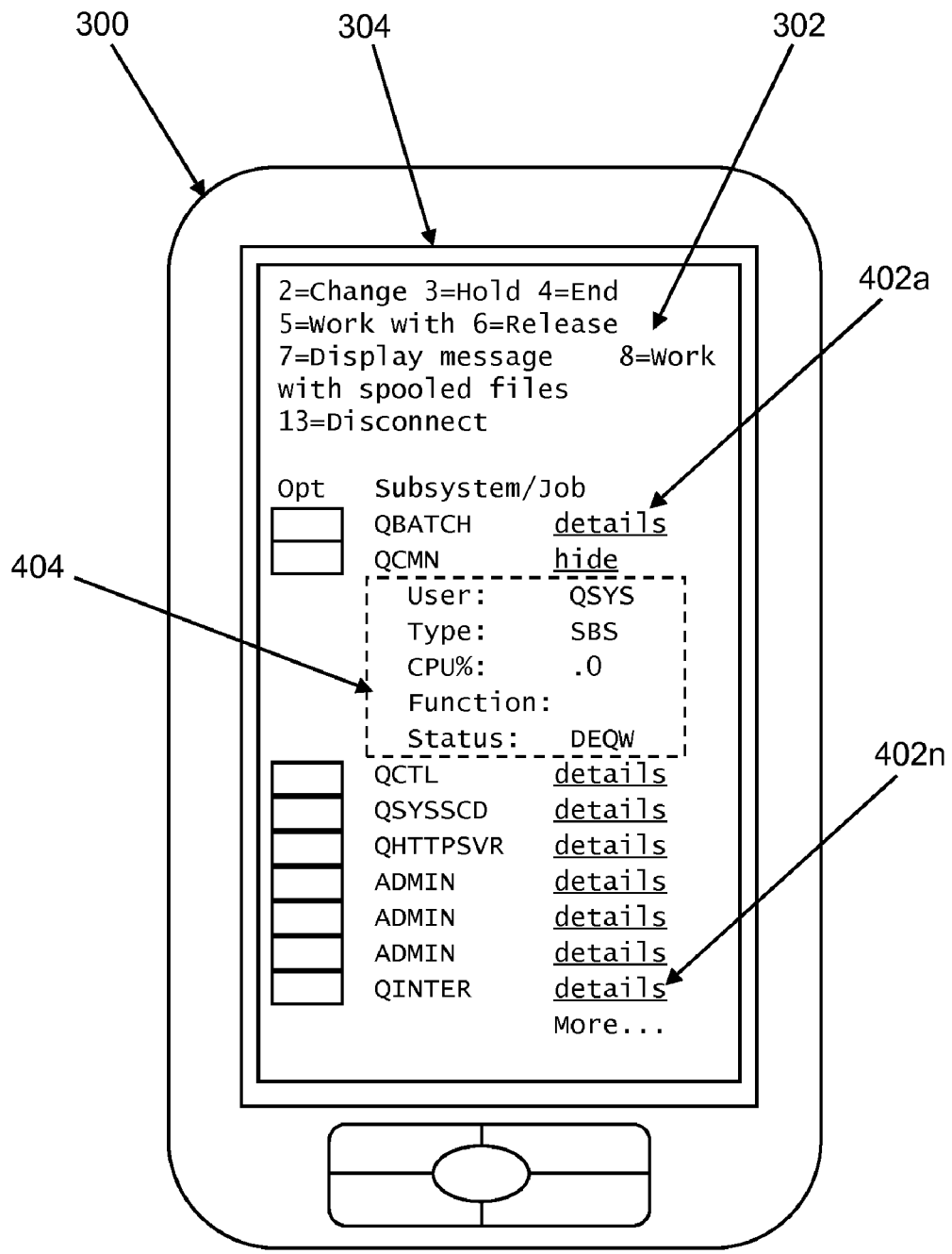
FIG. 4 shows a diagram of an application window displaying a host terminal application interface reconfigured in accordance with one or more embodiments of the present invention.

With reference now to FIG. 4, a diagram is shown of an application window displaying a host terminal application interface reconfigured in accordance with one or more embodiments of the present invention. Vertical columns that are indicated as "key" columns by a user preference are displayed, enabling a user to choose only the data items which are most critical to the nature of the application. As shown in FIG. 4, the "Opt" and "Subsystem/Job" columns are displayed. Horizontal row information is displayed on separate lines, thereby preserving the tabular format of host terminal application 146. To see information from columns that are not displayed (e.g., not designated by the user as "key" columns), the user selects one of user-selectable controls 402a-n. In response to the user selecting a user-selectable control, the row containing the user-selectable controls is expanded and the remaining information for that row from columns that were not displayed is shown to the user in table 404. In response to the user selecting a user-selectable control for a row that is expanded, the row will collapse back to the state where only the key column information is displayed and table 404 is no longer shown.

Figure 5:
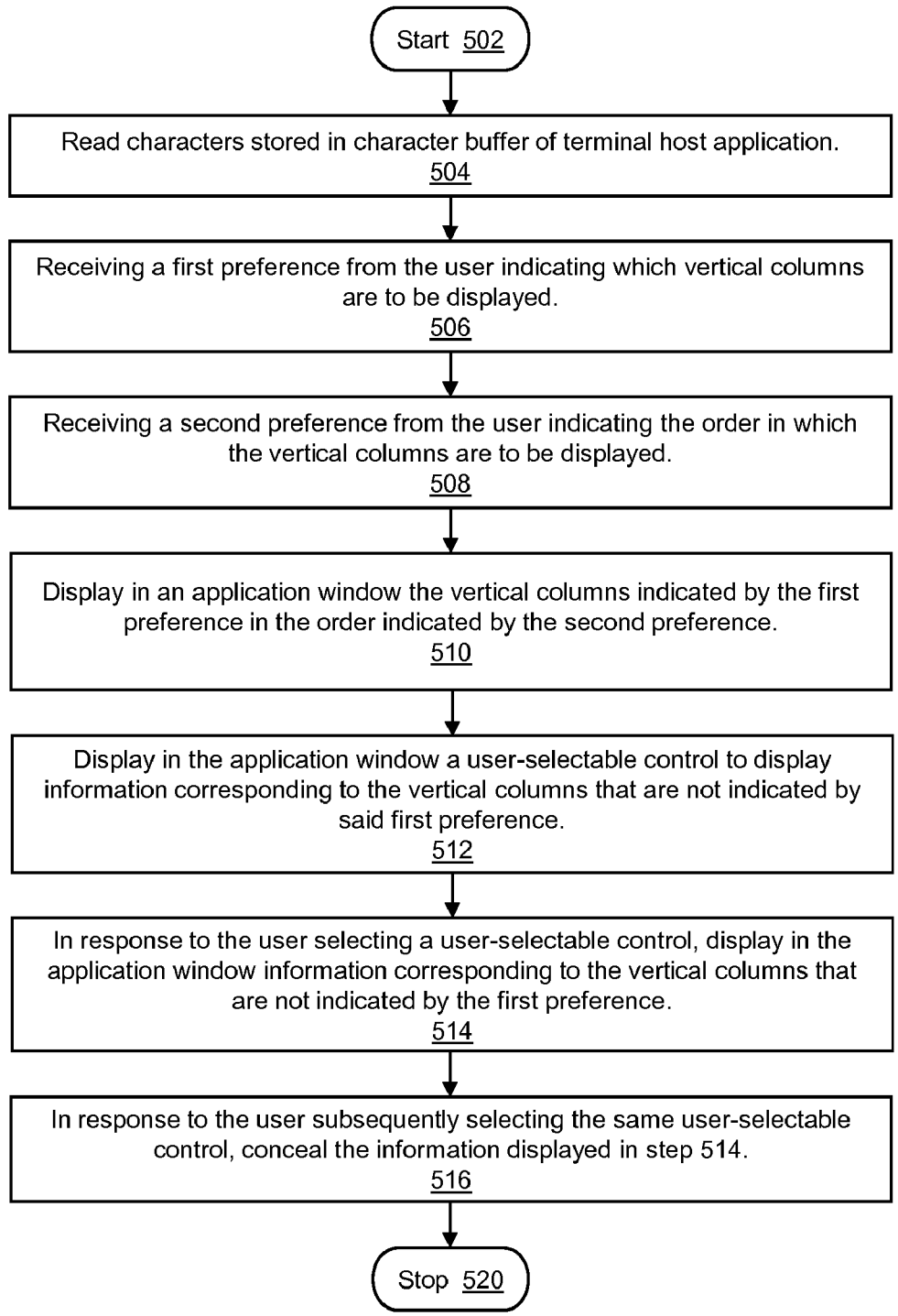
FIG. 5 shows a flowchart depicting a method, in accordance with one or more embodiments of the present invention, for transforming the display of a host table in a computer terminal host application into a user interface that is better suited for display within a small application window.

With reference now to FIG. 5, a flowchart is shown depicting a method, in accordance with one or more embodiments of the present invention, for reconfiguring the interface of a computer terminal host application to save space within an application window and provide an improved display of host table information. The process starts at initiator 502. Host application translator 148 reads the characters stored in character buffer 147 of host terminal application 146 (step 504). Host application translator 148 receives a first preference from a user indicating which vertical columns the user would like to have displayed (step 506). Host application translator 148 receives a second preference from said user indicating the order in which the user would like to have the indicated columns displayed (step 508). Host application translator 148 reconfigures the display by displaying in a window of application window 302 the vertical columns indicated by the first preference in the order indicated by the second preference (step 510). Host application translator 148 reconfigures the display by displaying a user-selectable control in application window 302 to display information corresponding to the vertical columns that are not indicated by the first preference (step 512). Host application translator 148, in response to a user selecting a user-selectable control, displays in application window 302 information corresponding to the vertical columns that are not indicated by the first preference (step 514). Host application translator 148, in response to a user subsequently selecting the same user-selectable control, conceals the information displayed in step 514 (step 516). The process ends at terminator 520.

While the present invention has been particularly shown and described with reference to an illustrative embodiment, it will be understood by those skilled in the art that various changes in form and detail may be made therein without departing from the spirit and scope of the invention. For example, a personal digital assistant is used for purposes of illustration, but the present invention is suited for any data processing system displaying a host terminal interface that would benefit from an application window optimized as described herein. Furthermore, as used in the specification and the appended claims, the term "computer" or "computer system" or "computing device" includes any data processing system including, but not limited to, personal computers, servers, workstations, network computers, mainframe computers, routers, switches, Personal Digital Assistants (PDA's), telephones, and any other system capable of processing, transmitting, receiving, capturing and/or storing data. The term "system" or "information system" includes a network of data processing systems.

The flowchart and diagrams in the Figures illustrate the architecture, functionality, and operation of possible implementations of systems, methods and computer program products according to various embodiments of the present invention. In this regard, each block in the flowchart or diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It will be further understood that the term "user" when used in this specification indicates not only the person using the system to interact with a computer application (the end user), but may also include the person configuring the system. In particular, column and order preferences supplied to the system may come from configuration data stored with the host application translator by an application developer as well as from the end user.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to illustrative embodiments thereof, it will be apparent that modifications and variations are possible without departing from the scope of the invention defined in the appended claims.

What is claimed is:

1. A method in a data processing system comprising:
    reading a plurality of characters stored in a character buffer of a computer terminal host application, wherein said computer terminal host application is displayed to a user as data in a table, wherein the table comprises a plurality of horizontal rows of said characters and a plurality of vertical columns of said characters, and wherein said computer terminal host application runs on a host data processing system, and wherein the table describes a state of a mainframe computer that is coupled to the host data processing system, wherein the state of the mainframe computer comprises a processor usage level of subsystems or jobs of the mainframe computer, names of subsystems or jobs within the mainframe computer, and user identifiers of users of the subsystems or jobs within the mainframe computer;
    receiving a first preference from said user wherein said first preference determines which of said vertical columns are to be displayed on a small display in a portable data processing system that has a smaller display size than the host data processing system;
    receiving a second preference from said user wherein said second preference determines an order in which said vertical columns are to be displayed on a small display in the portable data processing system;
    reconfiguring a display of said plurality of characters for an application window that is running on the portable data processing system, wherein said reconfiguring comprises:
        displaying in said application window said vertical columns indicated by said first preference in the order indicated by said second preference;
        displaying in said application window a first user-selectable control to display information corresponding to said vertical columns that are not indicated by said first preference, wherein said first user-selectable control is one of a plurality of user-selectable controls, and wherein said plurality of user-selectable controls are displayed as a new column in the table;
    in response to a first selection by said user of said first user-selectable control:
        expanding a row containing said first user-selectable control to create an open space on the application window on the small display in the portable data processing system; and
        displaying, in said open space on the application window on said small display in the portable data processing system, information corresponding to only a single row entry from the plurality of horizontal rows, wherein the information comprises information from multiple hidden columns for the single row entry, wherein the information comprises the processor usage level of a subsystem or job of the mainframe computer and the user identifier of a user of the subsystem or job within the mainframe computer, wherein said open space is created by pushing lower rows from the plurality of horizontal rows downward, wherein said lower rows are not obscured by said open space, and wherein an original tabular format of the computer terminal host application is preserved when application window information is displayed in said application window;
    displaying, in said application window, a second user-selectable control to hide said information corresponding to only the single row entry from the plurality of horizontal rows, wherein the second user-selectable control is displayed in the new column in the table, and wherein the second user-selectable control replaces the first user-selectable control; and
    in response to a second selection by said user of said second user-selectable control:
        concealing the display in said application window of information corresponding to said vertical columns that are not indicated by said first preference; and
        collapsing the row containing the second user-selectable control to remove the open space on the application window on the small display in the portable data processing system.

2. A data processing system comprising:
a processor;
a memory coupled to said processor;
a host application translator populating said memory, said host application translator comprising computer executable instructions for:
    reading a plurality of characters stored in a character buffer of a computer terminal host application, wherein said computer terminal host application is displayed to a user as data in a table, wherein the table comprises a plurality of horizontal rows of said characters and a plurality of vertical columns of said characters, and wherein said computer terminal host application runs on a host data processing system, and wherein the table describes a state of a mainframe computer that is coupled to the host data processing system, wherein the state of the mainframe computer comprises a processor usage level of subsystems or jobs of the mainframe computer, names of subsystems or jobs within the mainframe computer, and user identifiers of users of the subsystems or jobs within the mainframe computer;

receiving a first preference from said user wherein said first preference determines which of said vertical columns are to be displayed on a small display in a portable data processing system that has a smaller display size than the host data processing system;

receiving a second preference from said user wherein said second preference determines an order in which said vertical columns are to be displayed on a small display in the portable data processing system;

reconfiguring a display of said plurality of characters for an application window that is running on the portable data processing system, wherein said reconfiguring comprises:

displaying in said application window said vertical columns indicated by said first preference in the order indicated by said second preference;

displaying in said application window a first user-selectable control to display information corresponding to said vertical columns that are not indicated by said first preference, wherein said first user-selectable control is one of a plurality of user-selectable controls, and wherein said plurality of user-selectable controls are displayed as a new column in the table;

in response to a first selection by said user of said first user-selectable control:

expanding a row containing said first user-selectable control to create an open space on the application window on the small display in the portable data processing system; and displaying, in said open space on the application window on said small display in the portable data processing system, information corresponding to only a single row entry from the plurality of horizontal rows, wherein the information comprises information from multiple hidden columns for the single row entry, wherein the information comprises the processor usage level of a subsystem or job of the mainframe computer and the user identifier of a user of the subsystem or job within the mainframe computer, wherein said open space is created by pushing lower rows from the plurality of horizontal rows downward, wherein said lower rows are not obscured by said open space, and wherein an original tabular format of the computer terminal host application is preserved when application window information is displayed in said application window;

displaying, in said application window, a second user-selectable control to hide said information corresponding to only the single row entry from the plurality of horizontal rows, wherein the second user-selectable control is displayed in the new column in the table, and wherein the second user-selectable control replaces the first user-selectable control; and in response to a second selection by said user of said second user-selectable control:

concealing the display in said application window of information corresponding to said vertical columns that are not indicated by said first preference; and collapsing the row containing the second user-selectable control to remove the open space on the application window on the small display in the portable data processing system.

3. A computer program product comprising:

non-transitory computer readable storage media;

first program instructions to read a plurality of characters stored in a character buffer of a computer terminal host application, wherein said computer terminal host application is displayed to a user as data in a table, wherein the table comprises a plurality of horizontal rows of said characters and a plurality of vertical columns of said characters, and wherein said computer terminal host application runs on a host data processing system, and wherein the table describes a state of a mainframe computer that is coupled to the host data processing system, wherein the state of the mainframe computer comprises a processor usage level of subsystems or jobs of the mainframe computer, names of subsystems or jobs within the mainframe computer, and user identifiers of users of the subsystems or jobs within the mainframe computer;

second program instructions to receive a first preference from said user wherein said first preference determines which of said vertical columns are to be displayed on a small display in a portable data processing system that has a smaller display size than the host data processing system;

third program instructions to receive a second preference from said user wherein said second preference determines an order in which said vertical columns are to be displayed on a small display in the portable data processing system;

fourth program instructions to reconfigure a display of said plurality of characters for an application window that is running on the portable data processing system, wherein said reconfiguring comprises:

displaying in said application window said vertical columns indicated by said first preference in the order indicated by said second preference;

displaying in said application window a first user-selectable control to display information corresponding to said vertical columns that are not indicated by said first preference, wherein said first user-selectable control is one of a plurality of user-selectable controls, and wherein said plurality of user-selectable controls are displayed as a new column in the table;

in response to a first selection by said user of said first user-selectable control:

expanding a row containing said first user-selectable control to create an open space on the application window on the small display in the portable data processing system; and displaying, in said open space on the application window on said small display in the portable data processing system, information corresponding to only a single row entry from the plurality of horizontal rows, wherein the information comprises information from multiple hidden columns for the single row entry, wherein the information comprises the processor usage level of a subsystem or job of the mainframe computer and the user identifier of a user of the subsystem or job within the mainframe computer, wherein said open space is created by pushing lower rows from the plurality of horizontal rows downward, wherein said lower rows are not obscured by said open space, and wherein an original tabular format of the computer terminal host application is preserved when application window information is displayed in said application window;

displaying, in said application window, a second user-selectable control to hide said information corresponding to only the single row entry from the plurality of horizontal rows, wherein the second user-selectable control is displayed in the new column in the table, and wherein the second user-selectable control replaces the first user-selectable control; and in response to a second selection by said user of said second user-selectable control:
- concealing the display in said application window of information corresponding to said vertical columns that are not indicated by said first preference; and
- collapsing the row containing the second user-selectable control to remove the open space on the application window on the small display in the portable data processing system; and wherein the first, second, third, and fourth program instructions are stored on the non-transitory computer readable storage media.

* * * * *